(12) United States Patent
Mueller et al.

(10) Patent No.: US 7,699,512 B2
(45) Date of Patent: Apr. 20, 2010

(54) VEHICLE FITTING WITH LIGHT GUIDE

(75) Inventors: Wolfgang Mueller, Wermelskirchen (DE); Johan Vissers, SX Etten-Leur (NL); Robin Ndagijimana, Neuss (DE)

(73) Assignee: Johnson Controls GmbH, Burscheid (DE)

( * ) Notice: Subject to any disclaimer, the term of this patent is extended or adjusted under 35 U.S.C. 154(b) by 83 days.

(21) Appl. No.: 10/570,548

(22) PCT Filed: Aug. 24, 2004

(86) PCT No.: PCT/EP2004/009427

§ 371 (c)(1),
(2), (4) Date: Mar. 3, 2006

(87) PCT Pub. No.: WO2005/028251

PCT Pub. Date: Mar. 31, 2005

(65) Prior Publication Data

US 2007/0035958 A1 Feb. 15, 2007

(30) Foreign Application Priority Data

Sep. 5, 2003 (DE) .................... 103 41 409

(51) Int. Cl.
*F21V 9/00* (2006.01)
*B60Q 3/02* (2006.01)
*G02B 6/00* (2006.01)

(52) U.S. Cl. ............... 362/511; 362/490; 362/602; 362/546

(58) Field of Classification Search ........... 362/490, 362/493, 511, 546, 602, 605
See application file for complete search history.

(56) References Cited

U.S. PATENT DOCUMENTS

| | | | | |
|---|---|---|---|---|
| 1,581,735 A | * | 4/1926 | Hart | 362/490 |
| 3,852,585 A | | 12/1974 | Brunger | |
| 5,184,888 A | * | 2/1993 | Sakuma et al. | 362/511 |
| 5,641,221 A | | 6/1997 | Schindele et al. | |
| 6,241,358 B1 | * | 6/2001 | Higuchi et al. | 362/613 |
| 2002/0167820 A1 | * | 11/2002 | Haering et al. | 362/551 |

FOREIGN PATENT DOCUMENTS

| | | |
|---|---|---|
| DE | 199 02 244 A1 | 8/2000 |
| DE | 199 36 982 A1 | 3/2001 |
| DE | 101 35 478 A1 | 4/2003 |
| DE | 101 49 044 A1 | 4/2003 |
| DE | 103 41 409 A1 | 4/2005 |
| EP | 1 293 382 A2 | 3/2003 |
| FR | 2 830 493 A3 | 4/2003 |
| WO | WO 01/90634 A1 | 11/2001 |

OTHER PUBLICATIONS

International Search Report for PCT/EP2004/009427, date of mailing Nov. 16, 2004, 3 pages.

* cited by examiner

*Primary Examiner*—Ismael Negron
(74) *Attorney, Agent, or Firm*—Foley & Lardner LLP

(57) ABSTRACT

A fitting, especially a roof liner for the passenger compartment of a motor vehicle is provided with a flat light source having a plate-shaped light guide which radiates light in the direction of the visible side of the fitting. The front surface of the plate-shaped light guide protrudes at least partially above the flat side of the interior fitting opposite the visible side and actively cooperates with a source of illumination.

20 Claims, 3 Drawing Sheets

VEHICLE FITTING WITH LIGHT GUIDE

CROSS REFERENCE TO RELATED APPLICATIONS

The present Application claims the benefit of priority to the following International Application: PCT Patent Application No. PCT/EP2004/009427 titled "Fitting With An Integrated Light Source, Especially a Roof Liner" and filed on Aug. 24, 2004, which claims priority to German Patent Application No. DE10341409.6 titled "Fitting With An Integrated Light Source, Especially a Roof Liner" and filed on Sep. 5, 2003 (which are incorporated by reference in their entirety).

BACKGROUND

The invention relates to a fitting, especially a roof liner for the interior of a motor vehicle, with a flat light source.

It is known from practice to provide roof liners for quality motor vehicles with a flat light source, which illuminates the interior, in the form of electroluminescent films, which, for visual reasons, are covered with a partially transparent decorative material.

Fittings of this type impart an extraordinary sense of value to the interior, but can be manufactured only with a considerably outlay. On account of the decorative covering, these light sources serve typically to improve the ambience, but not the illumination of the interior.

Accordingly, it would be desirable to provide a roof liner of the generic type which can be manufactured in a visually attractive and simple manner and is suitable for the uniform illumination of the interior.

SUMMARY

According to one embodiment of the invention, a roof liner includes a light source having a plate-like light guide radiating light to the visible side, the end surface of the plate-like light guide protruding at least in some regions over the flat side of the fitting, which side is opposite the visible side, and actively cooperating with a source of illumination.

For manufacturing reasons and in view of it heating up, the source of illumination is preferably arranged on the other side of the fitting, i.e. on the flat side lying opposite the visible side. In this case, a device for transmitting light can be arranged between the end surface of the plate-like light guide and the source of illumination.

One embodiment can be realized by the plate-like light guide running all the way round flush with the visible side of the fitting and at least partially having a greater thickness than the fitting.

According to another embodiment, the fitting has an offset which points away from the visible side and within which the plate-like light guide is arranged in such a manner that it runs flush with the visible side of the offset, with, however, part of its end surface protruding over the rest of the fitting. In this case, the plate-like light guide advantageously extends in the region of the protruding end surface until on the other side of the fitting, i.e. is partially concealed behind the latter. As, a result, inhomogeneities in the radiation of light that occur in the region of the light supply can be concealed.

This design provides an enhancement if, for design reasons, the offset in the region of the plate-like light guide is of curved design, since a plate-like light guide can have zones of lesser illumination in curved edge regions depending on the radius of the curve. Owing to the fact that the plate-like light guide has a rectangular contour and is concealed in some regions by the fitting, which is cut out in a curved manner, the design freedom can be increased. The same applies analogously to other geometries with regard to the distribution of light.

The fitting may also be divided in the region of the offset into sections which are designed in a manner such that they can optionally be removed and can be replaced by visually and/or technically different sections. In this manner, a vehicle can retrospectively undergo an increase in value, for example by the installation of sections with a decorative material of higher quality or with an integrated, swing-out screen.

BRIEF DESCRIPTION OF THE FIGURES

The figures diagrammatically illustrate different embodiments of the invention by way of example.

DETAILED DESCRIPTION

Figure 1:
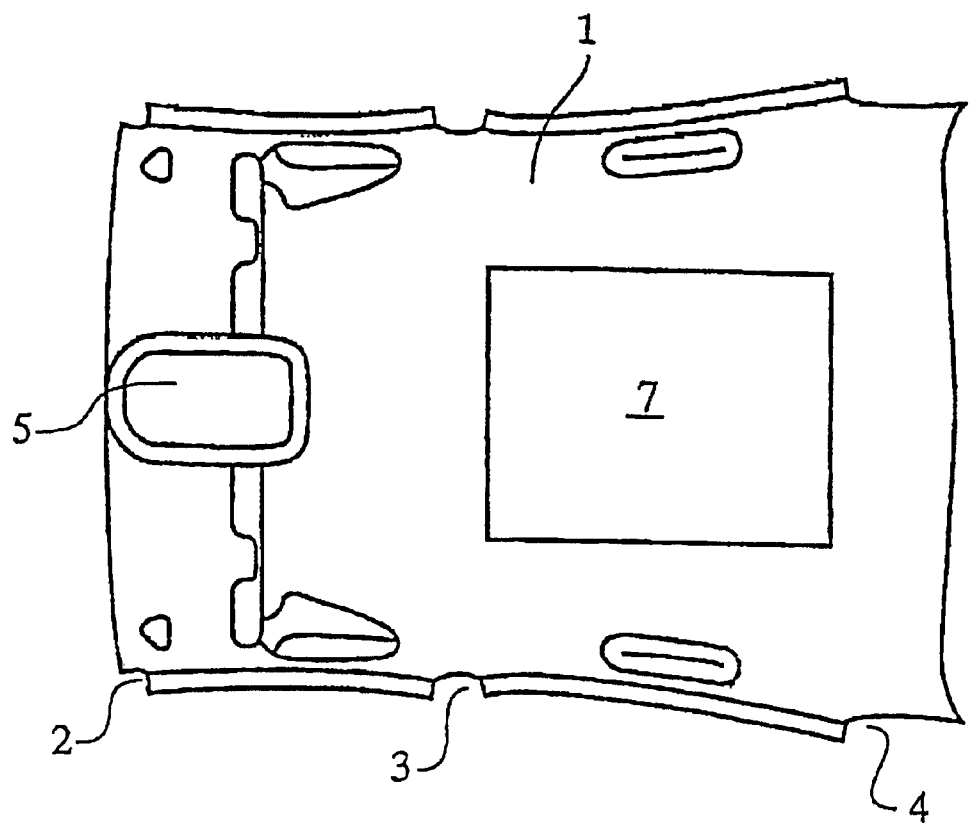
FIG. 1 shows an interior view of a fitting according to an exemplary embodiment in the form of a roof liner.

The roof liner 1 depicted in FIG. 1 comprises a three-dimensionally deformed, flat semi-finished product on which various functional regions, for example transitions 2 to 4 to the A-, B- and C-pillars of the vehicle or a console 5, are integrally formed.

Figure 4:
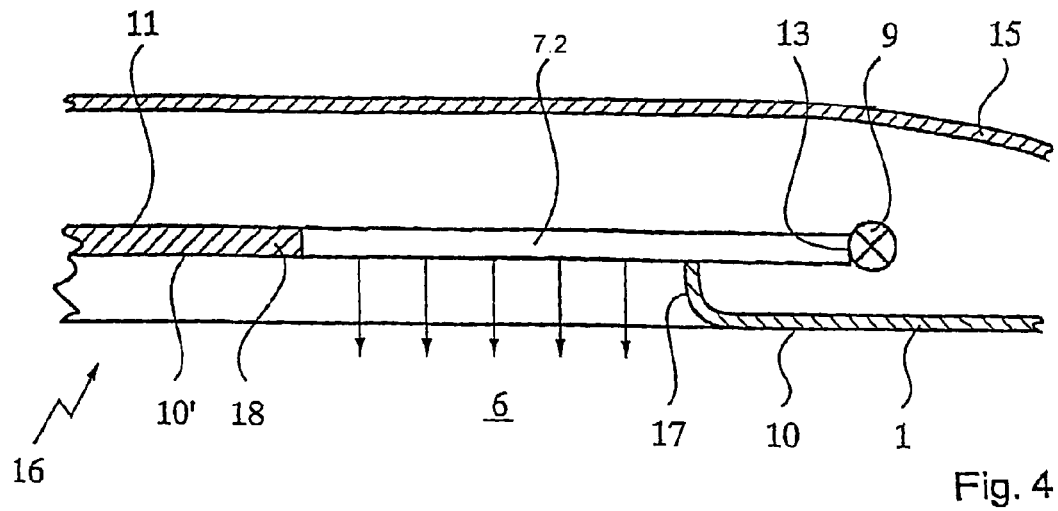
FIG. 4 shows a longitudinal section through the roof liner according to FIG. 3.

A plate-like light guide 7 which radiates light (arrows—shown in FIG. 4) toward the interior 6 of the vehicle and which can likewise have a curvature following the design of the roof liner is arranged above the rear seats.

Figure 2:
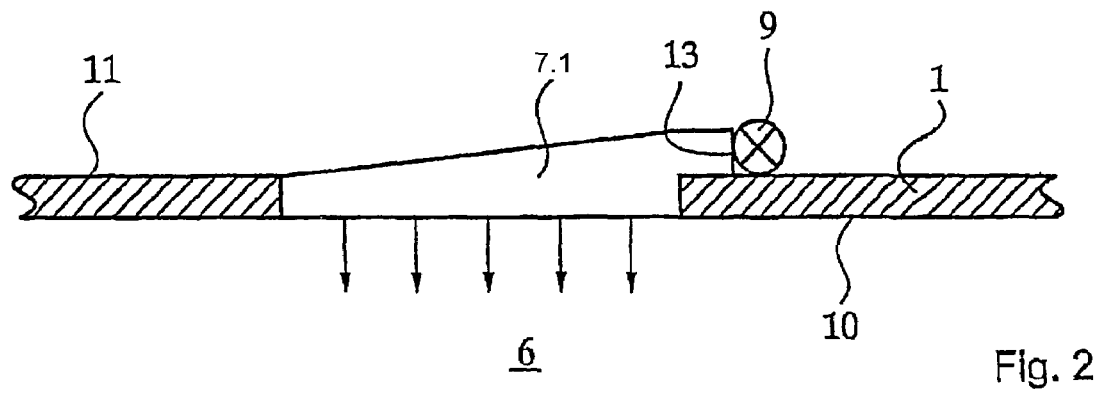
FIG. 2 shows a longitudinal section through a first design of the roof liner shown in FIG. 1.

In the case of the design according to FIG. 2, the light guide 7, shown as a light guide 7.1, is arranged flush in the roof liner on the visible side, but protrudes locally over the rear flat side 11 of the roof liner 1 and via its end surface 13 is directly in operation with a source of illumination 9. The location of the light supply, namely the end surface 13, is therefore spaced apart from that region of the light guide which is visible from the interior. Wedge-shaped areas of inhomogeneous illuminating strength which occur at the supply location (bright in the region of the source of illumination 9, dark in the intermediate spaces) are removed from the field of view and are therefore no longer annoying.

It goes without saying that the light supply can also take place by means of a light-transmission device, for example a strand of glass fiber, arranged between the light guide 7 and source of illumination 9.

Figure 3:
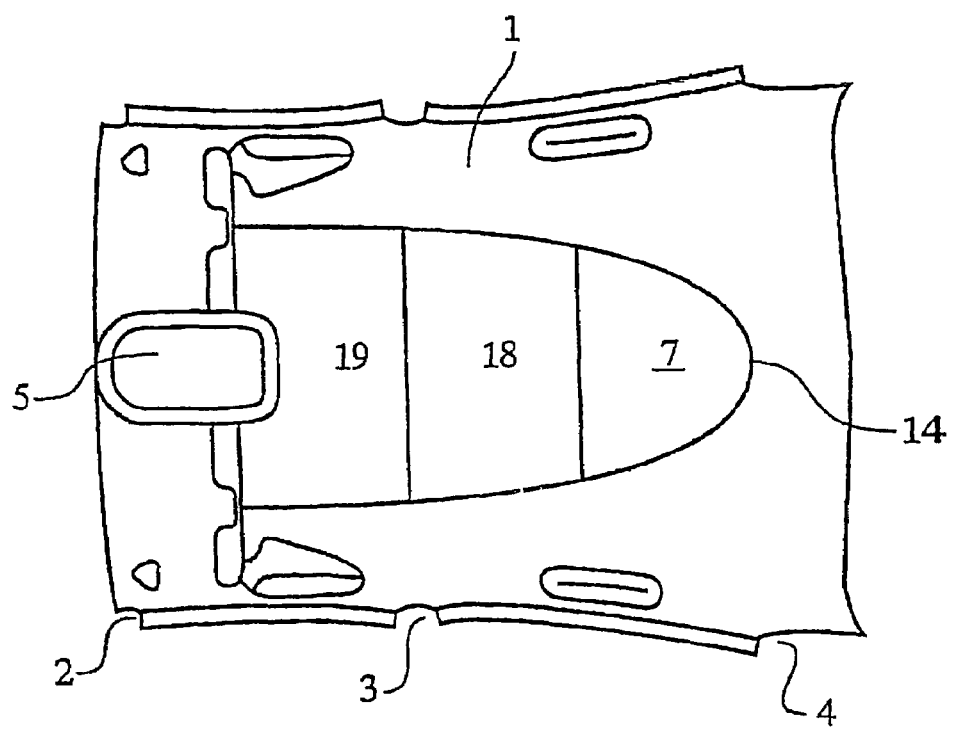
FIG. 3 shows an interior view of a roof liner according to another exemplary embodiment.

FIG. 3 shows a visually attractive roof liner 1, in which the visible extent of the plate-like light guide 7 has a curved contour 14 in the rear region. As can be seen from FIG. 4, the roof liner 1 is provided with an offset 16, which points away from the visible side and therefore curves in the direction of the vehicle roof 15 and in which the plate-like light guide 7, shown as light guide 7.2, is embedded flush with the visible side 10'. The transition of the remaining part of the roof liner 1 is formed by an encircling collar 17 on which the plate-like light guide 7 rests and over which it protrudes in such a manner that the roof liner conceals it in some regions.

Figure 5:
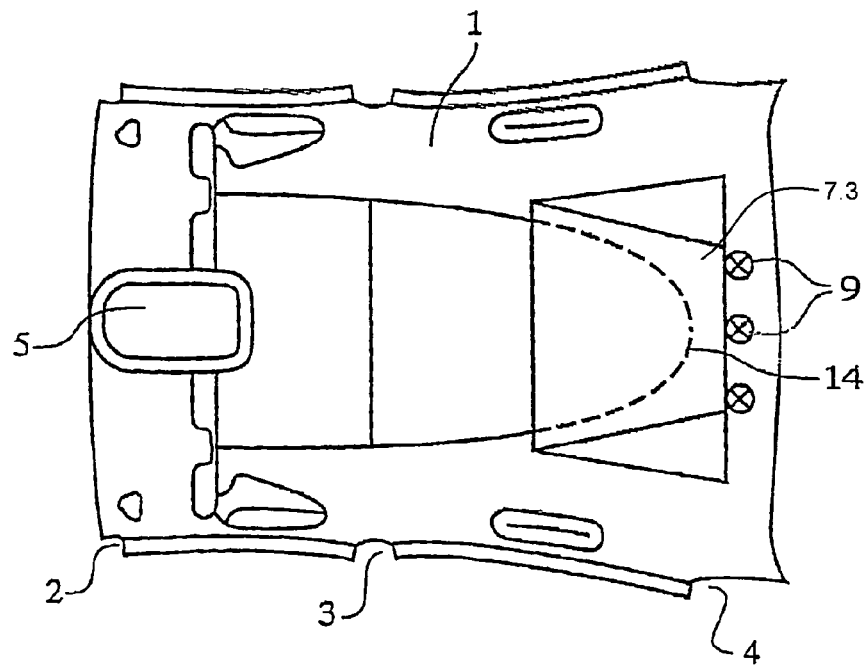
FIG. 5 shows the roof liner according to FIGS. 3 and 4 with a view of its rear side.

As can be seen from FIG. 5, the plate-like light guide 7, shown as a light guide 7.3, can therefore have a tetragonal design while it is bounded in a curved manner from the interior (FIG. 4) by a corresponding profile of the collar 17.

In addition to the plate-like light guide 7, the offset 16 also has removable sections 18, 19 which likewise rest on the collar 17 and, by means of the visible division, firstly improve the visual appearance of the roof liner 1 and, secondly, increase its variability, as previously described.

What is claimed is:

1. A fitting, for an interior of a motor vehicle, having a visible side configured to face toward the interior and a flat side which is opposite the visible side, the fitting comprising:
   a flat light source, with a plate-like light guide for radiating light toward the interior;
   an end surface of the plate-like light guide protruding at least in some regions over the flat side of the fitting and actively cooperating with an illumination device;
   an offset which points away from the visible side and within which the plate-like light guide is arranged in such a manner that it runs flush with a visible side of the offset, with part of its end surface protruding over the rest of the fitting; and
   a collar providing a transition between the plate-like light guide and the visible side of the fitting, the collar encircling the offset and supporting the plate-like light guide.

2. The fitting of claim 1, wherein the illumination device is arranged on the flat side of the fitting.

3. The fitting of claim 1, wherein the visible side of the offset is substantially parallel to the visible side of the rest of the fitting.

4. The fitting of claim 1, wherein the plate-like light guide at least partially has a greater thickness than the fitting.

5. The fitting of claim 1, wherein the collar is located adjacent to the plate-like light guide.

6. The fitting of claim 1, wherein the plate-like light guide extends in the region of the protruding end surface until over the flat side of the fitting.

7. The fitting of claim 1, wherein the offset in the region of the plate-like light guide is of curved design.

8. The fitting of claim 1, wherein the fitting is divided in the region of the offset into removable sections.

9. A fitting for an interior of a motor vehicle, comprising:
   a roof liner defining an opening and having a first side facing toward the interior and a second side facing away from the interior, the first side having an offset region extending away from the interior and within which the opening is located;
   a light guide disposed within the opening of the roof liner and substantially flush with a visible side of the offset;
   an end surface of the light guide extending at least partially over the second side of the roof liner, and configured to cooperate with an illumination device to radiate light from the illumination device toward the interior; and
   a collar providing a transition between the light guide and the visible side of the fitting, the collar encircling the offset and supporting the light guide.

10. The fitting of claim 9, wherein the light guide is substantially planar.

11. The fitting of claim 9, wherein the end surface of the light guide is configured to cooperate with an illumination device disposed on the second side of the roof liner.

12. The fitting of claim 9, wherein the visible side of the offset is substantially parallel to the visible side of the rest of the fitting.

13. The fitting of claim 9, wherein the light guide at least partially has a thickness greater than a thickness of the roof liner.

14. The fitting of claim 9, wherein the collar is located adjacent to the light guide.

15. The fitting of claim 9, wherein the fitting is divided in the region of the offset into removable sections.

16. An illuminated overhead system for a vehicle interior, comprising:
   a roof liner having a first side directed toward the vehicle interior and a second side directed away from the vehicle interior, the first side having an offset region extending away from the interior that defines an opening;
   a light guide having a substantially planar region disposed within the opening, and an end region extending beyond the opening and at least partially over the second side, the substantially planar region being substantially flush with a visible side of the offset;
   an illumination source disposed in an area adjacent the second side of the roof liner and arranged to communicate with the end region to radiate light through the light guide toward the vehicle interior; and
   a collar providing a transition between the light guide and the visible side of the fitting, the collar encircling the offset and supporting the light guide.

17. The system of claim 16, further comprising at least one removable section configured to cover the opening.

18. The system of claim 16, wherein the visible side of the offset is substantially parallel to the visible side of the rest of the fitting.

19. The system of claim 16, wherein the light guide has a substantially uniform thickness.

20. The system of claim 16 wherein the substantially planar region of the light guide comprises a wedge-shaped thickness profile.

* * * * *